United States Patent
Liu et al.

(10) Patent No.: US 7,515,627 B2
(45) Date of Patent: Apr. 7, 2009

(54) SYSTEM AND METHOD FOR ULTRA-WIDEBAND (UWB) COMMUNICATION TRANSCEIVER

(75) Inventors: Wen-Chung Liu, Hsinchu (TW); Gin-Kou Ma, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 676 days.

(21) Appl. No.: 11/212,700

(22) Filed: Aug. 29, 2005

(65) Prior Publication Data

US 2006/0165155 A1 Jul. 27, 2006

Related U.S. Application Data

(60) Provisional application No. 60/645,071, filed on Jan. 21, 2005.

(51) Int. Cl.
*H04B 1/00* (2006.01)

(52) U.S. Cl. ............... 375/133; 375/135; 375/136; 375/141; 375/146; 375/147

(58) Field of Classification Search ............ 375/130, 375/132–137, 140, 219, 259, 295, 340, 354, 375/141, 146, 147
See application file for complete search history.

(56) References Cited

U.S. PATENT DOCUMENTS

| 6,996,399 B2 * | 2/2006 | Zinn ............... 455/450 |
| 7,209,523 B1 * | 4/2007 | Larrick et al. ........ 375/295 |
| 7,286,599 B1 * | 10/2007 | Cheah .............. 375/238 |
| 2005/0223306 A1 * | 10/2005 | Franca-Neto ......... 714/784 |

* cited by examiner

*Primary Examiner*—David B Lugo
(74) *Attorney, Agent, or Firm*—Finnegan, Henderson, Farabow, Garrett & Dunner LLP (57) ABSTRACT

An ultra-wideband (UWB) transceiver for use in UWB communication includes a voltage-controlled oscillator (VCO) configured to periodically and sequentially generate a series of base frequencies based on a predetermined sequence and a waveform generator to generate carrier waves based on the generated base frequencies.

16 Claims, 4 Drawing Sheets

SYSTEM AND METHOD FOR ULTRA-WIDEBAND (UWB) COMMUNICATION TRANSCEIVER

CROSS REFERENCE TO RELATED APPLICATIONS

This application is based upon and claims the benefit of priority from U.S. Provisional Application No. 60/645,071 to Wen-Chung Liu et al. filed on Jan. 21, 2005, the entire contents of which are incorporated herein by reference

TECHNICAL FIELD

The present invention relates generally to ultra-wideband (UWB) communication devices, and more particularly to UWB communication transceivers.

BACKGROUND

Recent developments of ultra-wideband (UWB) technology have found use in radio communication systems primarily in a frequency band from 3.1 GHz to 10.6 GHz. UWB radios communicate with short pulses or cycles on the order of nanoseconds, spreading energy over a wide range of bandwidth. Currently available high frequency and large bandwidths of UWB radios may potentially provide high speed data communication and other applications. However, due to UWB's unlicensed use and wide spectrum, interference between different UWB radios may be present during communication and may have severe impact on communication quality between UWB radios.

To minimize the impact of the interference, UWB applications often use direct sequence spread spectrum technology or frequency hopping technology. Since frequency hopping technology requires both the radio transmitter and the radio receiver to hop over different bands of frequencies, a high-degree of synchronization between the transmitter and the receiver may be needed.

A successful direct sequence spread spectrum system, on the other hand, often relies on high processing gain (i.e., spreading factor) of the communication system to overcome interference. When the bit-rate of the communication system increases, the spreading factor of conventional spread spectrum system may decrease. For example, for a binary phase shift keyed (BPSK) system, when the communication bit rate reaches 200 Mbps, the spreading factor for the entire UWB spectrum (i.e., 3.1 GHz to 10.6 GHz) may be only 37.5, which may not be sufficient for a commercial communication system to overcome interference among multiple users.

Methods and systems consistent with certain features of the disclosed embodiments address one or more of the problems set forth above.

SUMMARY

One aspect of the present invention includes an ultra-wideband (UWB) transceiver for use in UWB communication. The UWB transceiver may include a voltage-controlled oscillator (VCO) configured to periodically and sequentially generate a series of base frequencies based on a predetermined sequence, and a waveform generator to generate carrier waves based on the generated base frequencies.

Another aspect of the present invention includes a UWB transmitter to transmit an information bit stream. The UWB transmitter may include one or more modulation sections to provide one or more modulation functions to modulate the information bit stream and a waveform generator including a plurality of voltage-controlled oscillators (VCOs) respectively corresponding to a plurality of base frequency bands. The UWB transmitter may also include a space-time-frequency mapping table that include information corresponding to relationships among the modulation functions, the plurality of base frequency bands, and time. The space-time-frequency mapping table may determine a modulation function from one or more modulation functions and a sequence for the plurality of base frequency bands. The space-time-frequency mapping table may also control the waveform generator to generate a carrier wave using one of the plurality of base frequency bands based on the sequence. Further, the space-time-frequency mapping table may control the modulation sections to modulate the information bit stream based on the modulation function and the carrier wave and to generate one or more modulated signal streams.

Another aspect of the present invention includes a UWB receiver to receive radio signals corresponding to an information bit stream. The UWB receiver may include one or more demodulation sections to demodulate received radio signals corresponding to the information bit stream using one or more modulation functions and a waveform generator including a plurality of voltage-controlled oscillators (VCOs) respectively corresponding to a plurality of base frequency bands. The UWB receiver may also include a space-time-frequency mapping table that include information corresponding to relationships among the modulation functions, the plurality of base frequency bands, and time. The space-time-frequency mapping table may determine, after synchronizing with the received radio signals, a modulation function from one or more modulation functions and a sequence for the plurality of base frequency bands. The space-time-frequency mapping table may also control the waveform generator to generate a carrier wave using one of the plurality of base frequency bands from the sequence. Further, the space-time-frequency mapping table may control the demodulation sections to demodulate the radio signals based on the determined modulation function and the carrier wave and to generate one or more demodulated signal streams.

Another aspect of the present invention includes a method for making UWB communication. The method may include obtaining an information bit stream and channel encoding the information bit stream. The method may also include determining a modulation function and a base frequency among a series of base frequencies respectively provided by a plurality of voltage-controlled oscillators (VCOs) and generating a carrier wave based on the base frequency. Further, the method may include modulating the encoded information bit stream using the carrier wave and the modulation function to generate modulated signals and sending the modulated signals using one or more antennas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and together with the description, serve to explain the principles of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
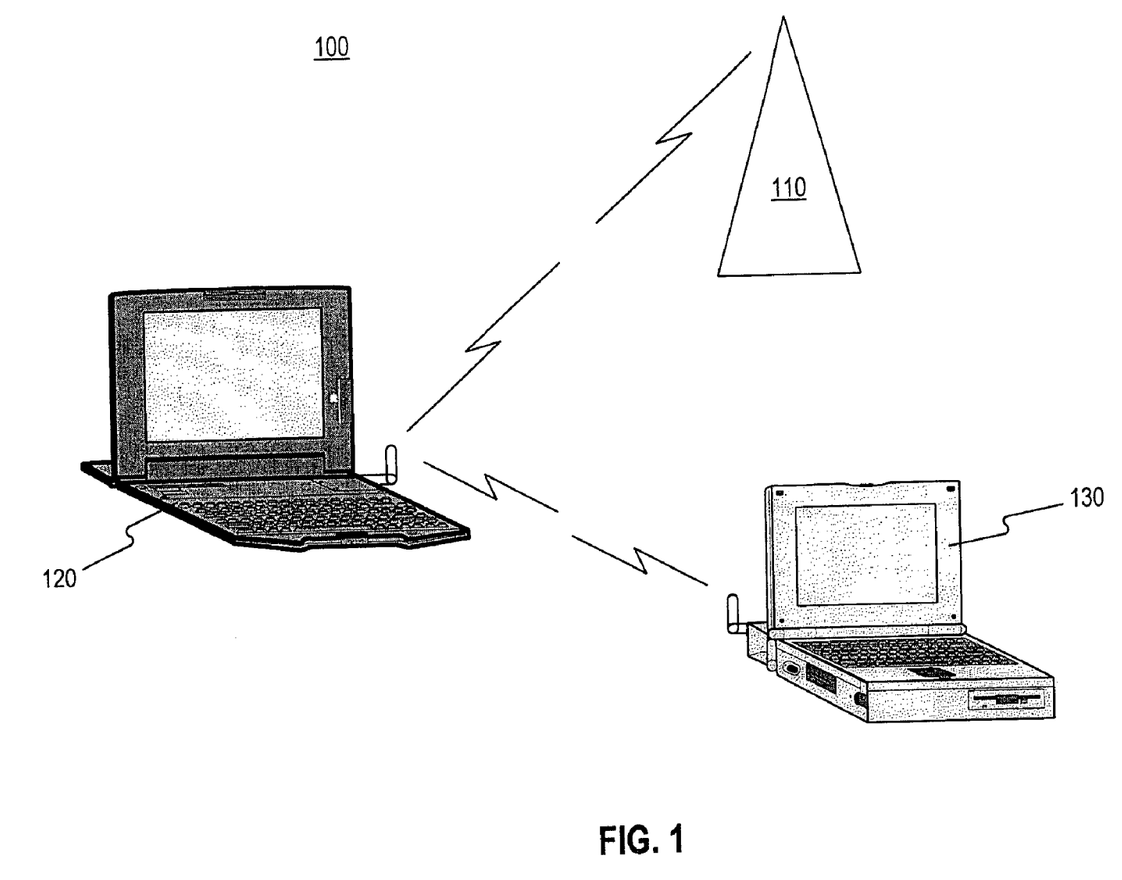
FIG. 1 is a pictorial illustration of exemplary communication network and system incorporating certain features of the present invention.

FIG. 1 shows an exemplary ultra-wideband (UWB) communication network 100. As shown in FIG. 1, UWB communication network 100 may include a base station 110, a first communication terminal 120, and a second communication terminal 130. The number of base stations and communication terminals is exemplary only and not intended to be limiting. Any number of base stations and communication terminals may be used without departing from the principles of the present invention.

Base station 110 may be any appropriate type of UWB base station, such as a land based communication base station or a satellite based communication device. Communication terminal 120 may be any appropriate UWB communication terminal capable of communicating with base station 110 in UWB frequency band. Communication terminal 120 may also be configured to communicate with other communication terminals, such as communication terminal 130, directly or indirectly via base station 110. Communication terminals 120 and/or 130 may be provided as a UWB transceiver to enable the communication between each other or between terminals and base station 110.

A UWB radio transceiver (i.e., transmitter and receiver) using direct sequence code division multiple access (DS-CDMA) and orthogonal frequency division multiplexing (OFDM) generally uses a waveform generator with a fixed frequency voltage-controlled oscillator (VCO) to generate carrier waves with a fixed base frequency. Interference from the fixed base frequency may increase the noise level on communication channels. The increased noise level may cause poor signal to noise ratio (SNR) of the communication channels. In certain embodiments consistent with the present invention, a UWB radio transceiver may be provided by using a waveform generator incorporating multiple VCOs having different frequencies. The waveform may then be used to generate carrier waves with different base frequencies changing with time. The communication signal from the UWB transceiver may then be modulated with frequencies gradually shifting within the entire UWB band (i.e., 3.1 GHz to 10.6 GHz) to minimize interference. Further, the UWB radio transceivers may also each incorporate two antennas, each antenna capable of independently sending/receiving signals at a designated time and frequency. Under such schemes, the communication channels may become a function of space, time, and frequency.

Figure 2:
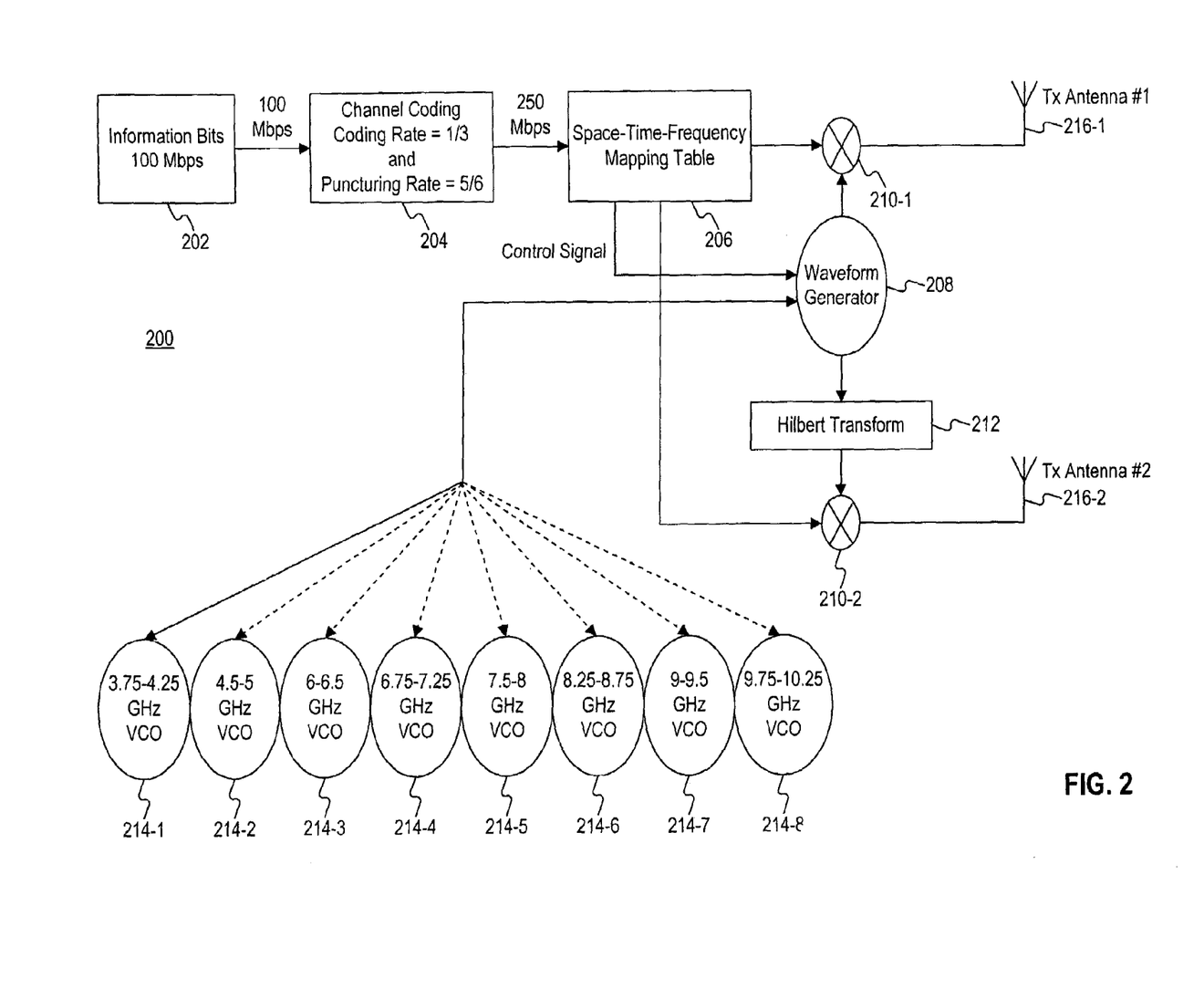
FIG. 2 illustrates a functional block diagram of an exemplary UWB transmitter consistent with the present invention.

FIG. 2 illustrates a functional block diagram of an exemplary UWB transmitter 200 consistent with the present invention. As shown in FIG. 2, radio UWB radio transmitter 200 may include a baseband section 202, a channel encoder 204, a space-time-frequency mapping table 206, a waveform generator 208, a Hilbert transform section 212, modulators 210-1 and 210-2, antennas 216-1 and 216-2, and VCOs 214-1 to 214-8. It is understood that the number of specified components is exemplary only and not intended to be limiting. Certain components may be removed, other components may be added, and the number of components may be changed without departing from the principle and scope of the present invention.

In operation, transmitter 200 may be provided with an information bit stream from baseband section 202, which constitutes the data to be transmitted. The information bit stream may have a high bit rate, such as 100 Mbps. Transmitter 200 may then encode the information bit stream via channel encoder 204. Channel encoder 204 may use any appropriate type of coding scheme to encode the information bit stream, such as convolutional coding, Reed-Solomon coding, superorthogonal turbo coding, or other bit-level or block coding mechanisms. The encoded bit stream may have a bit rate that depends on the original bit rate and the coding rate of channel encoder 204. For example, after being encoded at a coding rate of ⅓, an information bit stream having an original bit rate of 100 Mbps becomes an encoded bit stream having a bit rate of 300 Mbps.

The encoded bit stream may be "punctured" in channel encoder 204. "Puncturing" is a procedure for omitting some of the encoded bits in the transmitter to reduce the number of transmitted bits. In the example above, after being punctured at a rate of ⅚, the bit rate of encoded bit stream may be reduced to a bit rate of 250 Mbps. The encoded punctured bit stream may now be ready for transmission.

Transmitter 200 may then lookup space-time-frequency mapping table 206 to decide which VCO to use, when to send out the bit stream, and which antenna to use. Once transmitter 200 chooses a particular VCO (from VCOs 214-1 to 214-8), waveform generator 208 may then generate a carrier wave based on the VCO's frequency band. In certain other embodiments, multiple frequency bands may be provided by a single VCO, with variable center frequencies otherwise provided by VCOs 214-1 to 214-8.

The carrier wave generated by waveform generator 208 may then be supplied to modulator 210-1 to modulate the encoded punctured bit stream to generate transmission signals for, for example, antenna 216-1. On the other hand, the carrier wave may also be provided to Hilbert transform section 212 to generate a Hilbert transformed carrier wave, which may then be used by modulator 210-2 to generate transmission signals for antenna 216-2. Antennas 216-1 and 216-2 may be provided to transmit modulated signals separately under the control of transmitter 200. Alternatively, antennas 216-1 and 216-2 may act together as diversity antennas to enhance communication channel quality.

Space-time-frequency mapping table 206 may be stored in any appropriate type of memory device (not shown), such as read-only-memory (ROM), random-access-memory (RAM), or flash memory. Alternatively, space-time-frequency mapping table 206 may be a microcontroller or digital signal processor (DSP) configured to execute certain software programs to provide both control and data functions. Space-time-frequency mapping table 206 may also be dynamically configured by transmitter 200 or upon an input from a user of UWB transmitter 200. Space-time-frequency mapping table 206 may also control operation of waveform generator 208 and modulator 210-1 and 210-2. For example, space-time-frequency mapping table 206 may determine a base frequency to be generated by a VCO of waveform generator 208 such that waveform generator 208 may generate a carrier wave for use in modulation. Space-time-frequency mapping table 206 may also determine a modulation function provided by modulators 210-1 and 210-2, which may then use the carrier wave and the modulation function to perform modulation operation. An example of the contents of space-time-frequency mapping table 206 is illustrated in Table 1.

TABLE 1

Space-time-frequency mapping

| VCO Band (GHz) Frequency band of $f_{band\_x}(t)$ | Antenna #1 Sign of $f_{band\_x}(t)$ | Antenna #2 Sign of Hilbert($f_{band\_x}(t)$) | VCO Band Sequence |
|---|---|---|---|
| 3.75-4.25 | 1 | −1 | 1 |
| 4.5-5 | −1 | 1 | 2 |
| 6-6.5 | 1 | −1 | 3 |
| 6.75-7.25 | −1 | 1 | 4 |
| 7.5-8 | 1 | −1 | 5 |
| 8.25-8.75 | −1 | 1 | 6 |
| 9-9.5 | 1 | −1 | 7 |
| 9.75-10.25 | −1 | 1 | 8 |

As set forth in Table 1, the first column shows the respective different frequency bands of VCOs 214-1 to 214-8. For example, VCOs 214-1 to 214-8 may have respective frequency bands of approximate 3.75-4.25 GHz, 4.5-5 GHz, 6-6.5 GHz, 6.75-7.25 GHz, 7.5-8 GHz, 8.25-8.75 GHz, 9-9.5 GHz, and 9.75-10.25 GHz. The center frequencies corresponding to the frequency bands may be approximately 4 GHz, 4.75 GHz, 6.25 GHz, 7 GHz, 7.75 GHz, 8.5 GHz, 9.25 GHz, and 10 GHz, respectively. The second and third columns show modulation schemes for carrier waves generated corresponding to the various frequency bands, wherein $f_{band\_x}(t)$ is a time function of an individual frequency band in space-time-frequency mapping table 206. Although antipodal modulation is indicated in the second and third columns, other modulation schemes, such as trellis-coded modulation, may also be used. The fourth column shows the sequence in which transmitter 200 changes frequency bands. Although a continued sequence from a low frequency band to a high frequency band is shown in Table 1, those skilled in the art will now recognize that other sequences may also be used, such as a pseudo-random sequence.

As explained above, space-time-frequency mapping table 206 may also include means to perform control functions, such as determining a modulation function and/or controlling waveform generator 208, etc. The control functions may be implemented by hardware logic configured to perform specific control functions. Alternatively, the control functions may be implemented by software programs and/or reconfigurable logic.

Figure 3:
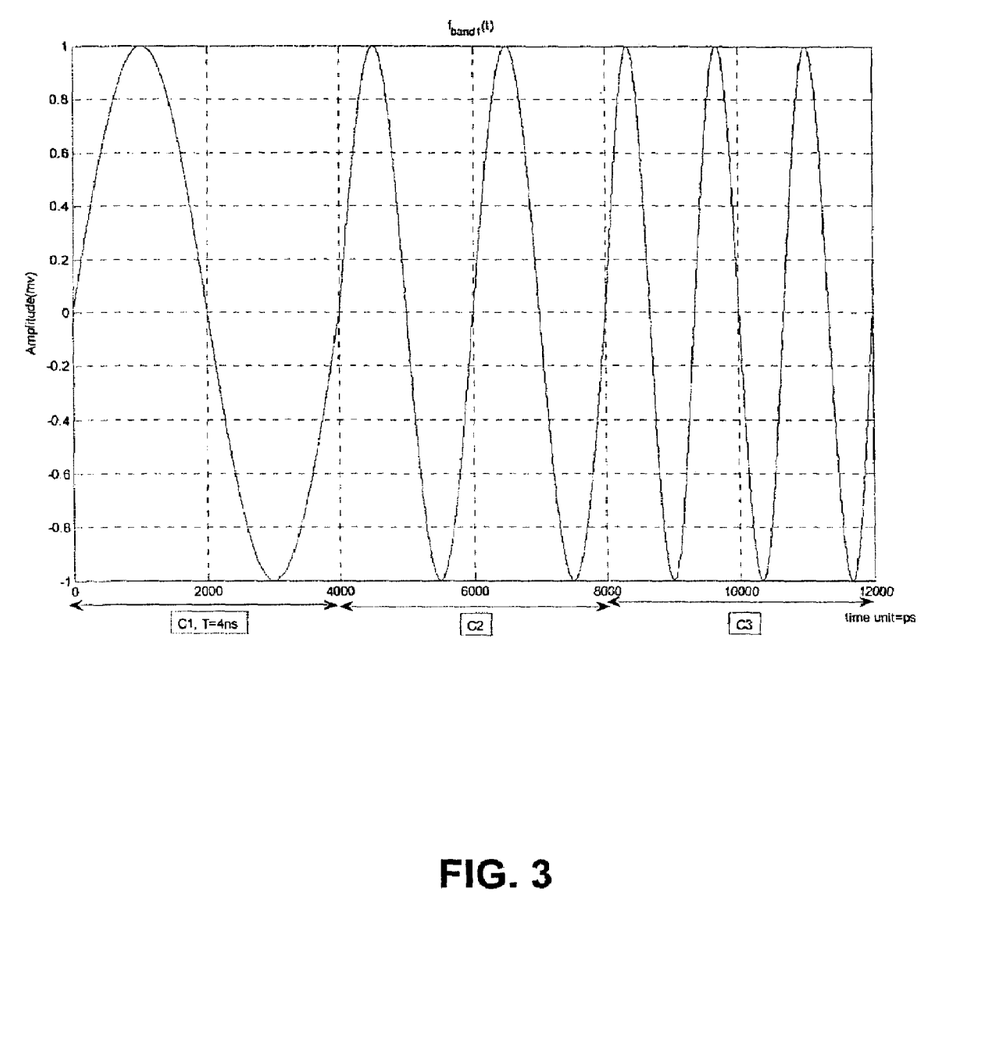
FIG. 3 is a graph illustrating relationships among selected parameters.

At the beginning of operation, transmitter 200 may start, for example, from frequency band 3.75-4.25 GHz corresponding to VCO 214-1. After transmitting a group of modulated signals containing a certain number of bits (e.g., 501 bits), transmitter 200 changes to the next frequency band according to the fourth column of Table 1. The frequency band may then be changed for successive groups each having the same number of bits transmitted, until all the information bits are transmitted. The sequence may need to be repeated according to the amount of information to be transmitted. For example, if, at a particular time during transmission, transmitter 200 is to transmit three bit symbols $[C_1, C_2, C_3]$ with a signal period of T=4 ns, the signals corresponding to $[C_1, C_2, C_3]$ transmitted by antenna 216-1 may be represented by:

$$Tx1\_{T1}=C_1 \times \text{Sign\_of\_}f_{band\_1}(t) \times f_{band\_1}(t), 0 \leq t < T1$$

$$Tx1\_{T2}=C_2 \times \text{Sign\_of\_}f_{band\_1}(t) \times f_{band\_1}(t), T1 \leq t < T2$$

$$Tx1\_{T3}=C_3 \times \text{Sign\_of\_}f_{band\_1}(t) \times f_{band\_1}(t), T2 \leq t < T3$$

where Tx1 is the signal to be transmitted by antenna 216-1, T1, T2, and T3 are the time periods between symbols $C_1$, $C_2$, and $C_3$, respectively, $f_{band\_1}(t)$ is the time function of the first VCO band of space-time-frequency mapping table, and Sign\_of\_$f_{band\_1}(t)$ is the sign of the time function of the first VCO band of space-time-frequency mapping table. FIG. 3 is a graphical illustration of relationships between $f_{band\_x}(t)$ and symbols $C_1$, $C_2$, and $C_3$.

As explained above, transmitter 200 may use either or both of antennas 216-1 and 216-2. When transmitter 200 uses both antennas as diversity antennas, the signals corresponding to bit symbols $[C_1, C_2, C_3]$ transmitted by antenna 216-2 may be represented by:

$$Tx2\_{T1}=C_1 \times \text{Sign\_of\_}f_{band\_1}(t) \times H(f_{band\_1}(t)), 0 \leq t < T1$$

$$Tx2\_{T2}=C_2 \times \text{Sign\_of\_}f_{band\_1}(t) \times H(f_{band\_1}(t)), T1 \leq t < T2$$

$$Tx2\_{T3}=C_3 \times \text{Sign\_of\_}f_{band\_1}(t) \times H(f_{band\_1}(t)), T2 \leq t < T3$$

where Tx2 is the signal to be transmitted by antenna 216-2, T1, T2, and T3 are the time periods between symbols $C_1$, $C_2$, and $C_3$, respectively, Sign\_of\_$f_{band\_1}(t)$ is the sign of the time function of the first VCO band of space-time-frequency mapping table, and H( ) represents Hilbert transformation.

Figure 4:
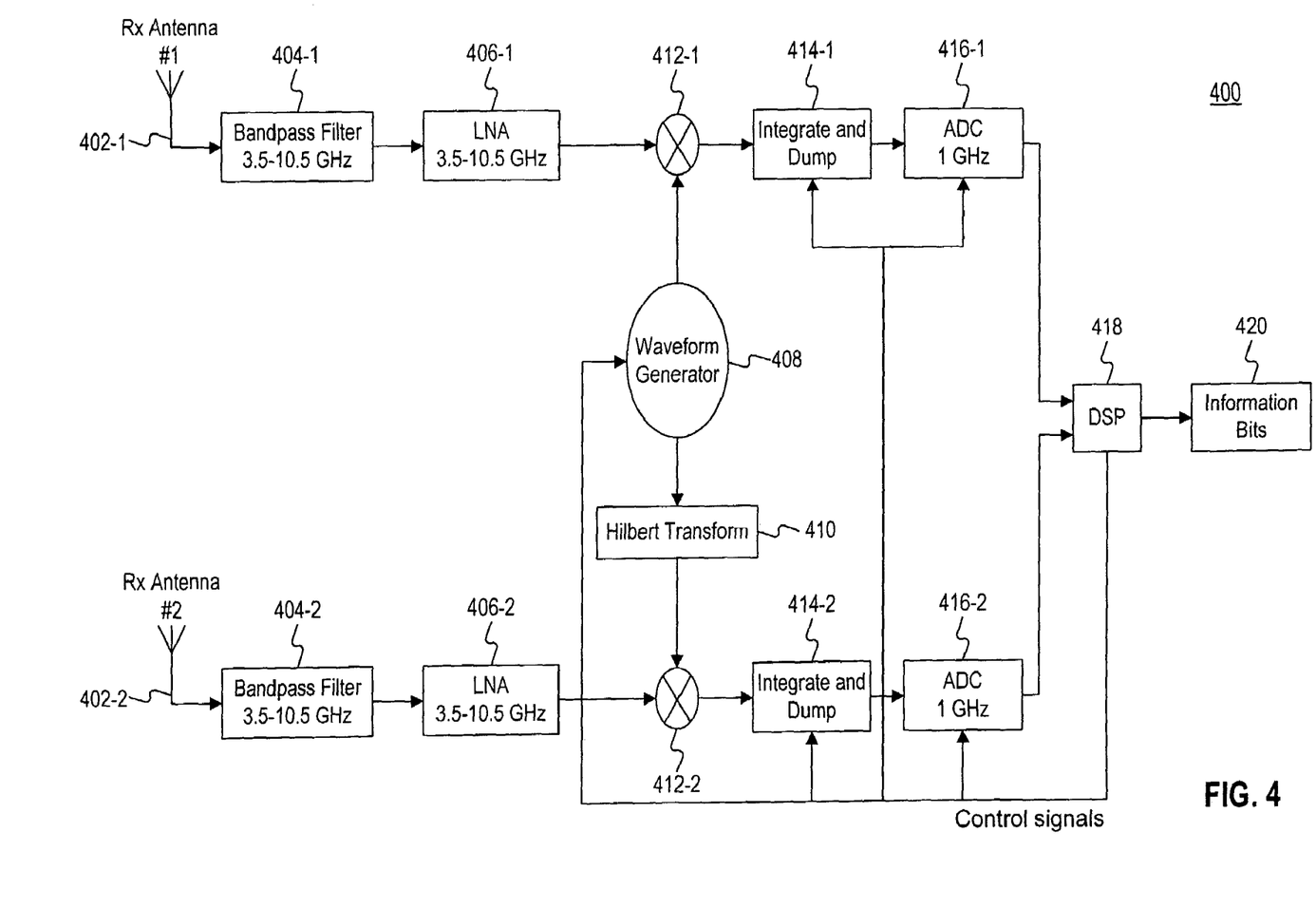
FIG. 4 illustrates a functional block diagram of an exemplary UWB receiver consistent with the present invention.

Referring now to FIG. 4, an exemplary UWB radio receiver 400 is shown which, after signals are transmitted by transmitter 200, receives the signals and recovers the information bit stream. Radio receiver 400 may include receiver antennas 402-1 and 402-2, bandpass filters 404-1 and 404-2, low noise amplifiers (LNAs) 406-1 and 406-2, a waveform generator 408, a Hilbert transform section 410, mixers 412-1 and 412-2, integrate and dump modules 414-1 and 414-2, analog-to-digital converters (ADCs) 416-1 and 416-2, a digital signal processor (DSP) 418, and a baseband section 420. The number and type of specified components are exemplary only and not intended to be limiting. Certain components may be removed, other components may be added, and the number of components may be changed without departing from the principle and scope of the present invention.

In operation, receiver 400 may first perform channel estimation and channel synchronization with a corresponding UWB transmitter, such as transmitter 200. Radio signals transmitted from transmitter 200 are received by receiver antennas 402-1 and 402-2. Receiver antennas 402-1 and 402-2 may convert received radio signals into electrical signals. Bandpass filters 404-1 and 404-2 are coupled to receiver antennas 402-1 and 402-2, respectively, to obtain the electrical signals.

Bandpass filters 404-1 and 404-2 may be any appropriate type of bandpass filters, with a pass band corresponding to the frequency and bandwidth of the UWB radio signal. For example, bandpass filters 404-1 and 404-2 may have a pass band of 3.5-10.5 GHz. Bandpass filters 404-1 and 404-2 may be further coupled to LNAs 406-1 and 406-2, respectively, to provide filtered signals.

LNAs 406-1 and 406-2 may be any appropriate type of low noise amplifiers, with high bandwidths corresponding to the UWB bandwidth. For example, LNAs 406-1 and 406-2 may have a bandwidth of 3.5-10.5 GHz. Electrical signals filtered by bandpass filters 404-1 and 404-1 may then be amplified by LNAs 406-1 and 406-2, respectively. LNAs 406-1 and 406-2 may be coupled to mixers 412-1 and 412-2, respectively, to provide amplified signals for further processing.

The amplified signals may be demodulated by mixers 412-1 and 412-2 based on carrier waveforms generated by waveform generator 408. Waveform generator 408 may be the same type of waveform generator as waveform generator 208 in transmitter 200. Waveform generator 408 may also include multiple VCOs or a variable VCO, with a series of separate frequency bands, such as frequency bands 3.75-4.25 GHz, 4.5-5 GHz, 6-6.5 GHz, 6.75-7.25 GHz, 7.5-8 GHz, 8.25-8.75 GHz, 9-9.5 GHz, and 9.75-10.25 GHz. After receiver 400 synchronizes with transmitter 200 via channel synchronization, waveform generator 408 may generate the same waveforms at the same frequency bands used to modulate transmission signals under control of a space-time-frequency table similar to table 206 of UWB transmitter 200. The space-time-frequency table of receiver 400 may be implemented and/or maintained by DSP 418 to identify the synchronized base frequency band and corresponding modulation and/or demodulation function at a particular time. The waveforms may then be used to demodulate the received signals.

Mixer 412-1 may demodulate the amplified signal using waveforms from waveform generator 408 without further transformation. Mixer 412-2 may demodulate the amplified signal using Hilbert transformed waveforms. Hilbert transform section 410 may be used to perform a Hilbert transformation on the waveforms from waveform generator 408. In the example above, which employs three bit symbols [$C_1, C_2, C_3$], the demodulated signals from mixer 412-1 corresponding to transmitted signals associated with [$C_1, C_2, C_3$] may be represented as:

$$Rx1\_{T1} = C_1 \times \text{Sign\_of\_}f_{band\_1}(t) \times f_{band\_1}(t) \times f_{band\_1}(t) + C_1 \times \text{Sign\_of\_}f_{band\_1}(t) \times H(f_{band\_1}(t)) \times f_{band\_1}(t), 0 \leq t < T1,$$

$$Rx1\_{T2} = C_2 \times \text{Sign\_of\_}f_{band\_1}(t) \times f_{band\_1}(t) \times f_{band\_1}(t) + C_2 \times \text{Sign\_of\_}f_{band\_1}(t) \times H(f_{band\_1}(t)) \times f_{band\_1}(t), T1 \leq t < T2,$$

$$Rx1\_{T3} = C_3 \times \text{Sign\_of\_}f_{band\_1}(t) \times f_{band\_1}(t) \times f_{band\_1}(t) + C_3 \times \text{Sign\_of\_}f_{band\_1}(t) \times H(f_{band\_1}(t)) \times f_{band\_1}(t), T2 \leq t < T3,$$

where Rx1 is the signal received by antenna 402-1, T1, T2, and T3 are the time periods between symbols $C_1$, $C_2$, and $C_3$, respectively, $f_{band\_1}(t)$ is the time function of the first VCO band of the space-time-frequency mapping table of receiver 400, $\text{Sign\_of\_}f_{band\_1}(t)$ is the sign of the time function of the first VCO band of space-time-frequency frequency mapping table, and H( ) represents the Hilbert transformation. The signal received by antenna 402-1 may be corresponding to transmitted signals from both diveristy antennas of a UWB transmitter.

Receiver 400 may use either or both antennas 402-1 and 402-2. When receiver 400 uses both antennas 402-1 and 402-2 as diversity antennas, the demodulated signals from mixer 412-2 corresponding to transmitted signals associated with [$C_1, C_2, C_3$] may be represented as:

$$Rx2\_{T1} = C_1 \times \text{Sign\_of\_}f_{band\_1}(t) \times f_{band\_1}(t) \times H(f_{band\_1}(t)) + C_1 \times \text{Sign\_of\_}f_{band\_1}(t) \times H(f_{band\_1}(t)) \times H(f_{band\_1}(t)), 0 \leq t < T1,$$

$$Rx2\_{T2} = C_2 \times \text{Sign\_of\_}f_{band\_1}(t) \times f_{band\_1}(t) \times H(f_{band\_1}(t)) + C_2 \times \text{Sign\_of\_}f_{band\_1}(t) \times H(f_{band\_1}(t)) \times H(f_{band\_1}(t)), T1 \leq t < T2,$$

$$Rx2\_{T3} = C_3 \times \text{Sign\_of\_}f_{band\_1}(t) \times f_{band\_1}(t) \times H(f_{band\_1}(t)) + C_3 \times \text{Sign\_of\_}f_{band\_1}(t) \times H(f_{band\_1}(t)) \times H(f_{band\_1}(t)), T2 \leq t < T3,$$

where Rx2 is the signal received by antenna 402-2, T1, T2, and T3 are the time periods between symbols $C_1$, $C_2$, and $C_3$, respectively, $f_{band\_1}(t)$ is the time function of the first VCO band of the space-time-frequency mapping table of receiver 400, $\text{Sign\_of\_}f_{band\_1}(t)$ is the sign of the time function of the first VCO band of space-time-frequency Frequency mapping table, and H( ) represents the Hilbert transformation.

Additional signal processing may be performed upon the demodulated signals from mixers 412-1 and 412-2. The demodulated signals may be passed through integrate and dump modules 414-1 and 414-2. Integrate and dump modules are well-known in the art and generally perform the function of recovering high frequency signals on receivers. A recovered signal, that is, an estimated soft value, may be represented as $$\text{estimated\_soft\_value} = \int Rx(t)dt$$

where Rx(t) is a signal from mixer 412-1 or 412-2 to be recovered and the integration may be performed during a predetermined sampling period. Integrate and dump modules 414-1 and 414-2 may be coupled to ADCs 416-1 and 416-2, respectively, in order to convert the processed signals from integrate and dump modules 414-1 and 414-2 into digital form.

DSP 418 may be coupled with both ADCs 416-1 and 416-2 to receive digitized signals. DSP 418 may also provide control functions to waveform generator 408, integrate and dump modules 414-1 and 414-2, and ADCs 416-1 and 416-2. DSP 418 may be any appropriate type of digital signal processor having signal processing and control capabilities corresponding to the bit rate of the incoming signal. DSP 418 may implement channel decoding algorithms corresponding to the channel encoding algorithms used by transmitter 200, as is well known to those skilled in the art. DSP 418 may merge two digitized signals from ADCs 416-1 and 416-2 (if receiver 400 uses both antennas 402-1 and 402-2) into one signal before any decoding and processing. The one merged signal may be decoded and converted to an information bit stream. Alternatively, DSP 418 may decode and process two digitized signals from ADCs 416-1 and 416-2 separately to increase signal-to-noise ratio (SNR). When processing the two digitized signals from ADCs 416-1 and 416-2 separately, or when processing a digitized signal from either of ADCs 416-1 and 416-2 (i.e., receiver 400 uses either of antennas 402-1 and 402-2, DSP 418 may implement an equalizer and a channel decoder to finally obtain the original information bit stream. The two digitized signals may be added to generate an average signal to be channel decoded by DSP 418.

Optionally, transmitter 200 and receiver 400 may be combined with each other to form a UWB transceiver. For example, antennas 216-1 and 216-2 may be the same antennas 402-1 and 402-2, respectively. Certain transmitting functions and receiving functions, however, may be implemented separately.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An ultra-wideband (UWB) transmitter to transmit an information bit stream, comprising:
   one or more modulation sections to provide one or more modulation functions to modulate the information bit stream;

a waveform generator including a plurality of voltage-controlled oscillators (VCOs) respectively corresponding to a plurality of base frequency bands;

a space-time-frequency mapping table that includes information corresponding to relationships among the modulation functions, the plurality of base frequency bands, and time; and means, responsive to the information stored in the table, to determine a modulation function from one or more modulation functions and a sequence for the plurality of base frequency bands, to control the waveform generator to generate a carrier wave using one of the plurality of base frequency bands based on the sequence, and to control the modulation sections to modulate the information bit stream based on the modulation function and the carrier wave and to generate one or more modulated signal streams.

2. The UWB transmitter according to claim 1, wherein the plurality of base frequency bands include approximately 3.75-4.25 GHz, 4.5-5 GHz, 6-6.5 GHz, 6.75-7.25 GHz, 7.5-8 GHz, 8.25-8.75 GHz, 9-9.5 GHz, and 9.75-10.25 GHz.

3. The UWB transmitter according to claim 1, further comprising:
a channel encoding section coupled with the modulation sections to encode and puncture the information bit stream before modulation.

4. The UWB transmitter according to claim 1, further comprising:
one or more antennas coupled with the modulation sections to transmit the one or more modulated signal streams.

5. The UWB transmitter according to claim 1, wherein modulated signals corresponding to information symbols $[C_1, C_2, C_3]$ are respectively represented as $C_1 \times \text{Sign\_of\_}f_{band\_n}(t) \times f_{band\_n}(t)$ in which time t satisfies $0 \leq t < T1$; $C_2 \times \text{Sign\_of\_}f_{band\_n}(t) \times f_{band\_n}(t)$ in which time t satisfies $T1 \leq t < T2$, and $C_3 \times \text{Sign\_of\_}f_{band\_n}(t) \times f_{band\_n}(t)$ in which time t satisfies $T2 \leq t < T3$, wherein T1, T2, and T3 are the time periods between symbols $C_1$, $C_2$, and $C_3$, respectively, $f_{band\_n}(t)$ is the time function of the one of the plurality of base frequency bands, and $\text{Sign\_of}_{13}\ f_{band\_n}(t)$ is the sign of the time function of the one of the plurality of base frequency bands.

6. A communication device comprising a UWB transmitter according to claim 1.

7. A communication network comprising at least one communication device according to claim 6.

8. An ultra-wideband (UWB) receiver to receive radio signals corresponding to an information bit stream, comprising:
one or more demodulation sections to demodulate received radio signals corresponding to the information bit stream using one or more modulation functions;

a waveform generator including a plurality of voltage-controlled oscillators (VCOs) respectively corresponding to a plurality of base frequency bands;

a space-time-frequency mapping table that includes information corresponding to relationships among the modulation functions, the plurality of base frequency bands, and time; and means, responsive to the information stored in the table, to determine, after synchronizing with the received radio signals, a modulation function from one or more modulation functions and a sequence for the plurality of base frequency bands, to control the waveform generator to generate a carrier wave using one of the plurality of base frequency bands from the sequence, and to control the demodulation sections to demodulate the radio signals based on the determined modulation function and the carrier wave and to generate one or more demodulated signal streams.

9. The UWB receiver according to claim 8, wherein the plurality of base frequency bands include approximately 3.75-4.25 GHz, 4.5-5 GHz, 6-6.5 GHz, 6.75-7.25 GHz, 7.5-8 GHz, 8.25-8.75 GHz, 9-9.5 GHz, and 9.75-10.25 GHz.

10. The UWB receiver according to claim 8, further comprising:
one or more antennas to receive the radio signals.

11. The UWB receiver according to claim 10, further comprising:
one or more bandpass filters corresponding to a pass frequency band of approximate 3.5-10.5 GHz to filter the received radio signals before demodulation.

12. The UWB receiver according to claim 8, further comprising:
a digital signal processor (DSP) to provide control functions to the waveform generator and to provide one or more channel decoders to decode the demodulated signal streams into an information bit stream.

13. A communication device comprising a UWB receiver according to claim 8.

14. A communication network comprising at least one communication device according to claim 13.

15. A method for making ultra-wideband (UWB) communication, comprising:
obtaining an information bit stream;
channel encoding the information bit stream;
determining a modulation function and a base frequency among a series of base frequencies respectively provided by a plurality of voltage-controlled oscillators (VCOs);
generating a carrier wave based on the base frequency;
modulating the encoded information bit stream using the carrier wave and the modulation function to generate modulated signals;
sending the modulated signals using one or more antennas;
receiving the modulated signals using one or more antennas;
synchronizing with the received signals to determine the modulation function and to generate the base frequency from the series of base frequencies respectively provided by a plurality of voltage-controlled oscillators (VCOs);
generating a carrier wave based on the base frequency;
demodulating the received modulated signals based on the modulation function and the carrier wave to generate demodulated signals; and
channel decoding the demodulated signals to recover the information bit stream.

16. The method according to claim 15, further comprising:
periodically and sequentially updating the base frequency based on the series of base frequencies.

* * * * *

UNITED STATES PATENT AND TRADEMARK OFFICE
CERTIFICATE OF CORRECTION

| | |
|---|---|
| PATENT NO. | : 7,515,627 B2 |
| APPLICATION NO. | : 11/212700 |
| DATED | : April 7, 2009 |
| INVENTOR(S) | : Wen-Chung Liu et al. |

It is certified that error appears in the above-identified patent and that said Letters Patent is hereby corrected as shown below:

In claim 5, column 9, line 41, "Sign_of$_{13}$ f$_{band\_n}$(t)" should read --Sign_of_f$_{band\_n}$(t)--.

Signed and Sealed this

Second Day of June, 2009

JOHN DOLL
*Acting Director of the United States Patent and Trademark Office*